United States Patent [19]

Sallas

[11] Patent Number: 4,930,113
[45] Date of Patent: May 29, 1990

[54] SUPPRESSION OF AIR-COUPLED NOISE PRODUCED BY SEISMIC VIBRATORS

[75] Inventor: John J. Sallas, Plano, Tex.
[73] Assignee: Halliburton Geophysical Services, Inc., Dallas, Tex.
[21] Appl. No.: 331,615
[22] Filed: Mar. 30, 1989
[51] Int. Cl.⁵ ............................................. G01V 1/02
[52] U.S. Cl. ..................................... 367/190; 181/108
[58] Field of Search ............... 181/108, 113, 114, 121, 181/400, 401; 367/189, 190; 324/83 F3

[56] References Cited

U.S. PATENT DOCUMENTS

| | | | |
|---|---|---|---|
| 4,025,724 | 5/1977 | Davidson, Jr. et al. | 179/1 P |
| 4,056,163 | 11/1977 | Wood et al. | 181/113 |
| 4,122,303 | 10/1978 | Chaplin et al. | 367/191 |
| 4,153,815 | 5/1979 | Chaplin et al. | 367/191 |
| 4,417,098 | 11/1983 | Chaplin et al. | 367/191 |
| 4,473,906 | 9/1987 | Warnaka et al. | 381/71 |
| 4,616,352 | 10/1986 | Sallas et al. | 367/190 |
| 4,654,871 | 3/1987 | Chaplin et al. | 367/191 |
| 4,664,223 | 5/1987 | Huizer et al. | 181/113 |
| 4,782,446 | 11/1988 | Ehler et al. | 367/190 |

OTHER PUBLICATIONS

Press and Ewing, "Ground Roll Coupling to Atmospheric Compressional Waves", Geophysics 16, pp. 416–430, 1949.
"Ground Force Control of a P-Wave Vibrator," Sallas et al., SEG Seismic Field Techniques Workshop, Aug. 13–16, 1985, Monterey, Calif.
"Cancellation Process Uses 'Anti-Noise' to Quiet Problem at Its Source," Chessher, Occupational Health and Safety News Digest, Oct. 1987.

Primary Examiner—Brian S. Steinberger
Attorney, Agent, or Firm—Thomas R. Weaver; Michael G. Fletcher; Hilary E. Pearson

[57] ABSTRACT

Air wave noise caused by a vibrating baseplate on a seismic vibrator is reduced or eliminated through active cancellation of sound. In active cancellation, the detection of acceleration of the baseplate is used to form a counterpart wave which is equal in amplitude but opposite in phase; a speaker produces an opposite air wave to cancel the baseplate air wave.

2 Claims, 8 Drawing Sheets

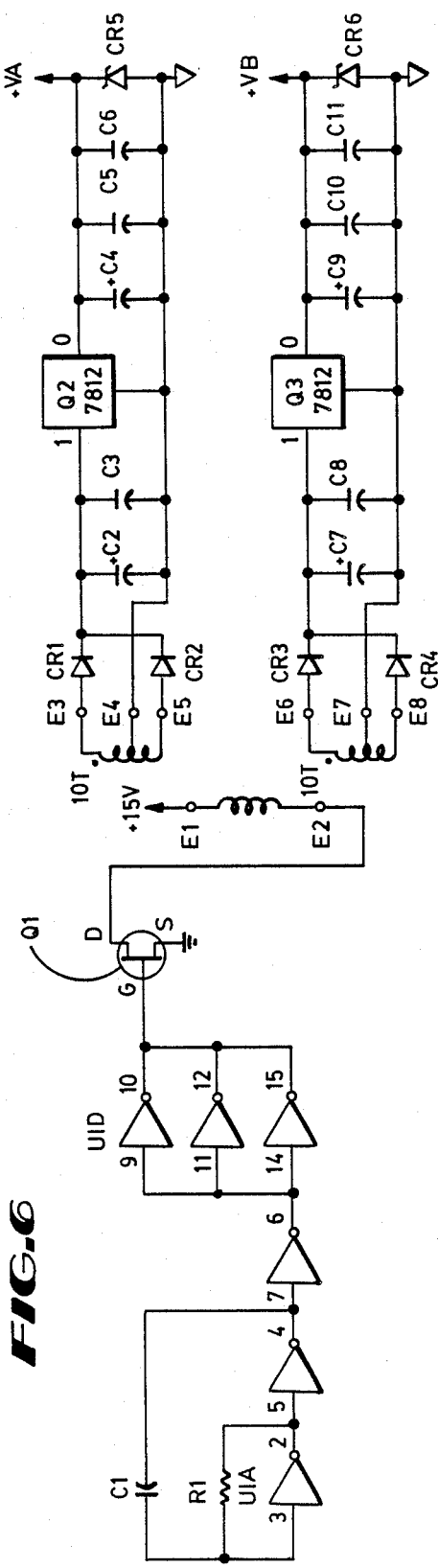
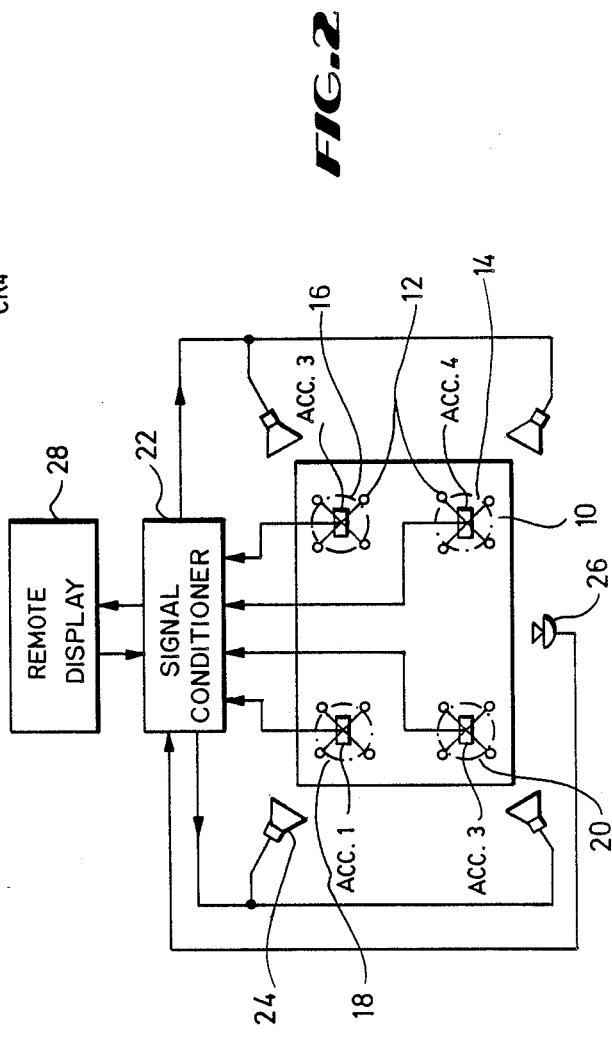
FIG.6
FIG.2

SUPPRESSION OF AIR-COUPLED NOISE PRODUCED BY SEISMIC VIBRATORS

BACKGROUND OF THE INVENTION

This application relates to noise reduction methods; specifically, it relates to methods and apparatus for reducing unwanted sound waves produced by seismic vibration equipment.

Seismic Waves

Geophysical surveys to estimate the depth, shape, and composition of subterranean formations commonly use seismic vibrators to induce seismic waves, which may be detected using a number of sensitive instruments called geophones.

Seismic vibrators typically vibrate according to a controlled sweep of frequencies, usually starting at a very low frequency and ending at a high frequency. The vibrations produced take several forms; the pressure or "P" wave is the wave of greatest intensity at depth, traveling through the earth faster and at greater depths than other waves such as shear waves. Normally, the P-wave is of greatest interest in the mapping of rock formations.

Geophones, usually placed in an array or grid-like pattern on the surface of the earth or just beneath, are used to detect reflections of vibrations from rock strata. Measurement of the intensity and time delay of an arriving reflected wave at numerous locations allows the mapping of rock strata, and gives information about the thickness and composition of the layers.

The basic principle of seismic surveys is simple. Each of the rock layers underneath a seismic vibrator reflects the P-waves induced at the surface according to its contrast in acoustic impedance. For example, an interface in which a low impedance layer lies above a high impedance layer will reflect a large proportion of the incident wave; therefore, the reflected wave will be of greater amplitude.

Geophones typically record the amplitude of detected vibrations at a given time for later analysis. Determination of the number of layers, and their depths are made through comparison of the amplitude of the wave with the time at which the reflection arrived after the initial induced vibration. The time-delay for a reflected wave to arrive at a geophone is an indication of the depth from which the wave is reflected. As might be expected, time delay increases with depth.

Air-Coupled Waves

Air-coupled waves are coherent noise trains produced by a surface seismic source, propagating at the speed of sound in air. Air waves may be entirely coupled with the air, or, in the case of low frequency (6–8 Hz) waves, may be partially coupled with the near surface if the phase velocity of the Rayleigh wave and the speed of sound in air are the same. The latter has been described in Press and Ewing, "Ground Roll Coupling to Atmospheric Compressional Waves", Geophysics 16, pp. 416–30.

Seismic vibrators usually operate above ground, with the vibrational energy transmitted into the earth via a baseplate resting on the ground. In field surveys, it is common to make use of a vibrator mounted on a truck. Since the majority of the vibrator is exposed to the air, including the upper surface of the baseplate, some of the vibrational energy during operation is transmitted through the air as sound waves.

These air-coupled sound waves are often of sufficient intensity to disrupt or impair measurements. Geophones are calibrated to detect minuscule reflections of the initial P-wave; waves propagating through the air may cause slight vibrations of the geophone or of the ground itself, which are of relatively high amplitude, causing air-coupled waves to be recorded. Recordings of the air-coupled waves can be of sufficient intensity to mask underlying moderate depth reflection data. Because air wave noise can cause the ground to vibrate, burial or shielding of geophones fails to alleviate the problem.

Air wave noise is strongest at higher frequencies (i.e., 30 Hz and above); existing filtering techniques for removing Rayleigh waves have proven ineffective at such high frequencies because current geophone group spacing is too great, and creates a spatial aliasing problem. The effects of air wave noise may be suppressed through more closely spaced arrays of geophone elements; however, dramatically increasing the number of geophones used for a survey increases the cost and complexity of conducting a survey.

Sound Absorption

Attempts have been made to passively attenuate the airwave, including enclosing either the baseplate or truck with canvas or other thin materials. These methods have provided very little attenuation.

SUMMARY OF THE INVENTION

In accordance with the invention, erroneous geophone readings due to air-coupled waves may be reduced or eliminated through cancellation of the waves.

Active suppression of air waves is achieved by monitoring the motion of the vibrator to generate a signal in anti-phase (i.e., 180 degrees out of phase) with the air wave, which is output to loudspeakers. Active suppression makes use of the principle of destructive interference, cancelling an air wave by generating its opposite.

Using an array of transducers, the vibrational frequency and amplitude of a baseplate can be approximated. Summation and signal conditioning provides for the generation of an electrical signal, output to a loudspeaker placed near the vibrating plate, to form a counterpart wave which is equal in amplitude but opposite in phase.

BRIEF DESCRIPTION OF THE DRAWINGS

While the invention is specifically set forth in the appended claims, the reader may understand the invention more easily by referring to the following detailed description of specific embodiments, in which:

FIG. 2 is a block diagram of the electrical system;

FIGS. 6, 7A and 7B depict a preferred power amplifier for use with the present invention.

DETAILED DESCRIPTION OF A SPECIFIC EMBODIMENT

In seismic geophysical surveying, it is becoming increasingly common to use the Vibroseis method, in which the seismic vibrations are produced by using a vibrator in contact with the ground. This vibrator is operated in cycles in which the frequency of vibration is swept through a range known to be advantageous for geophysical surveying, normally, therefor about 5 Hz to about 150 Hz.

Figure 1:
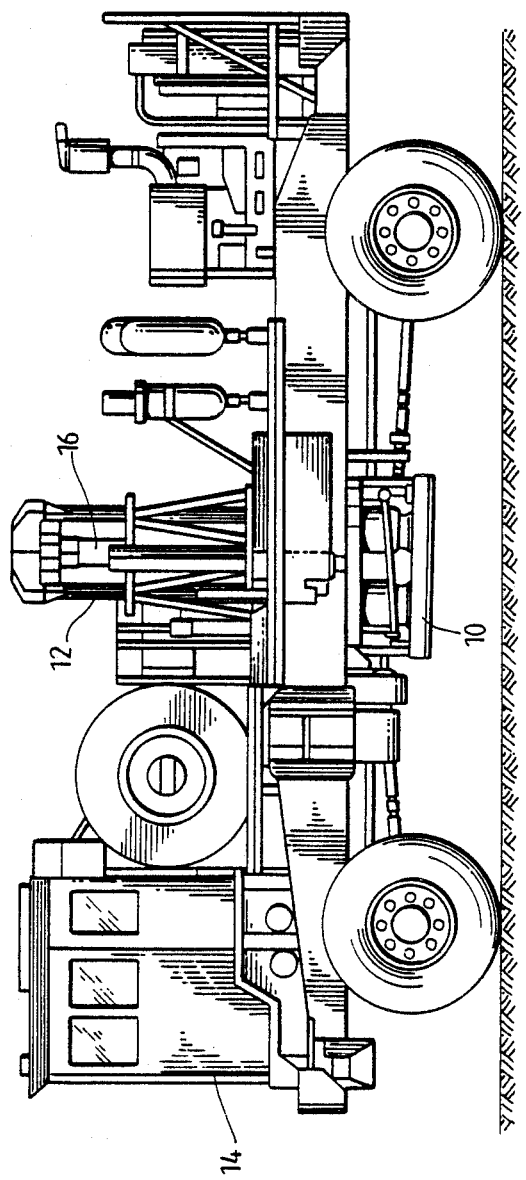
FIG. 1 depicts a truck having a seismic vibrator.
Figure 3:
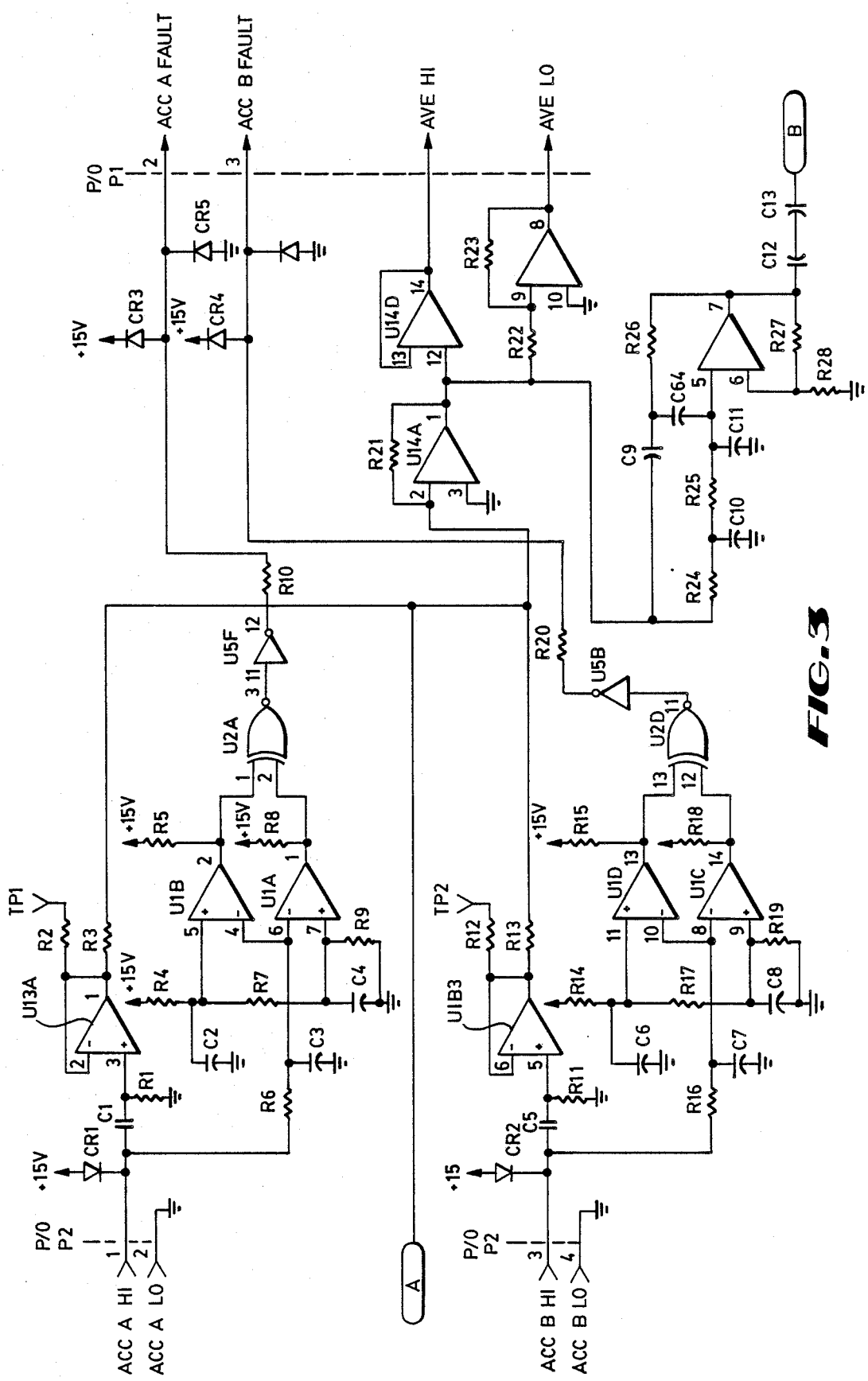
FIGS. 3, 4, 5A and 5B depict a preferred summer and speaker compensation network for use in the signal conditioner.
Figure 4:
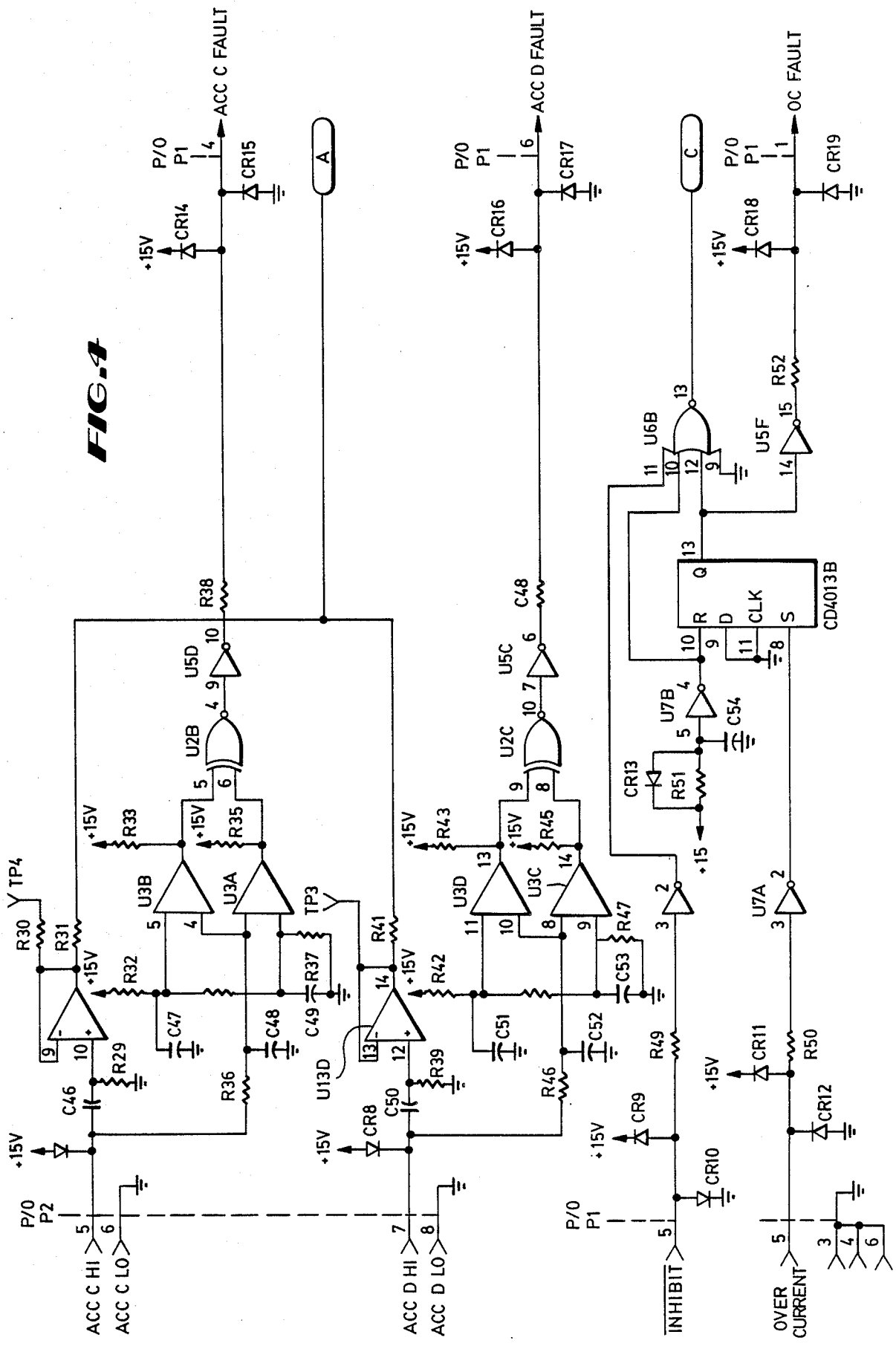
Figure 5A:
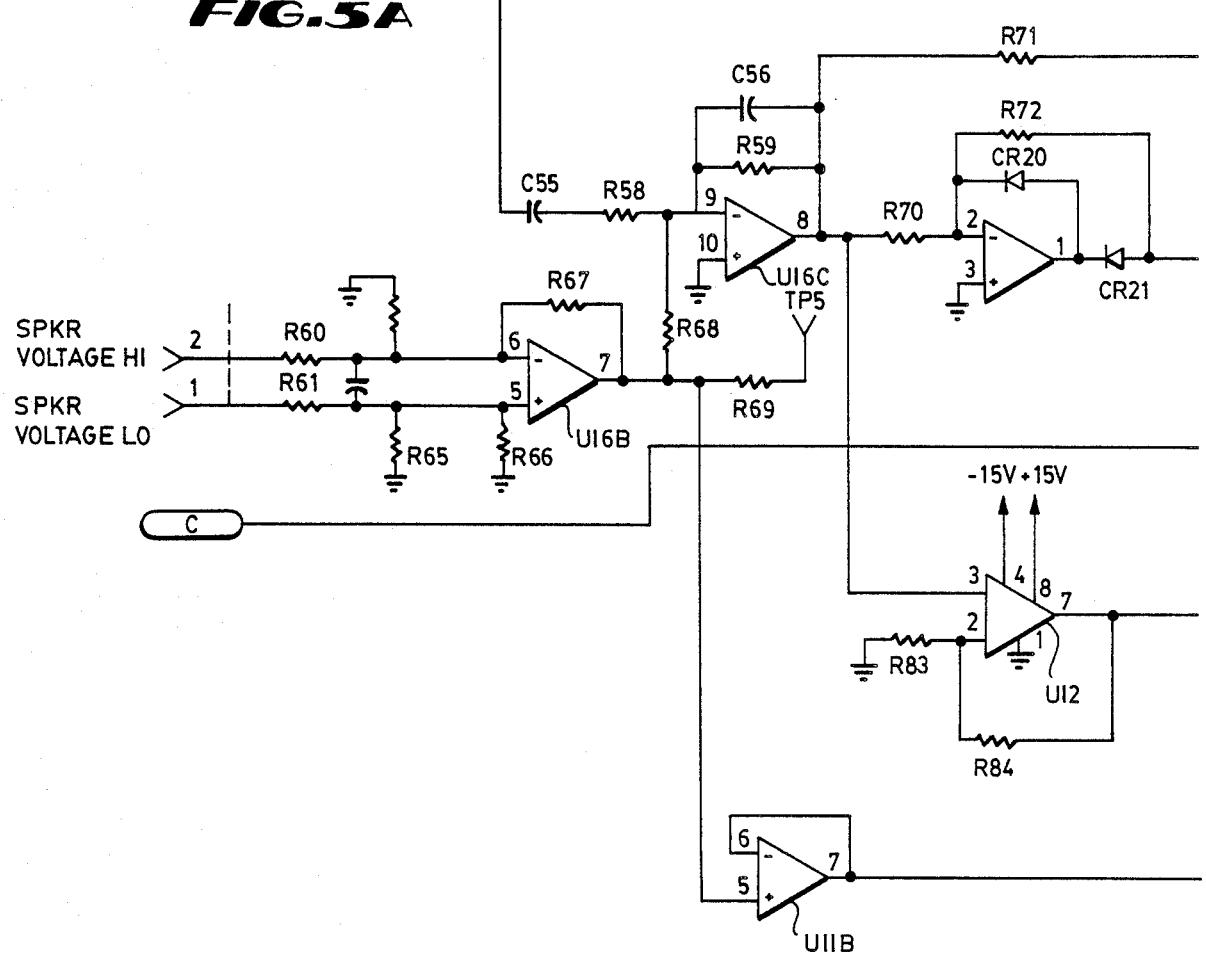
Figure 5B:
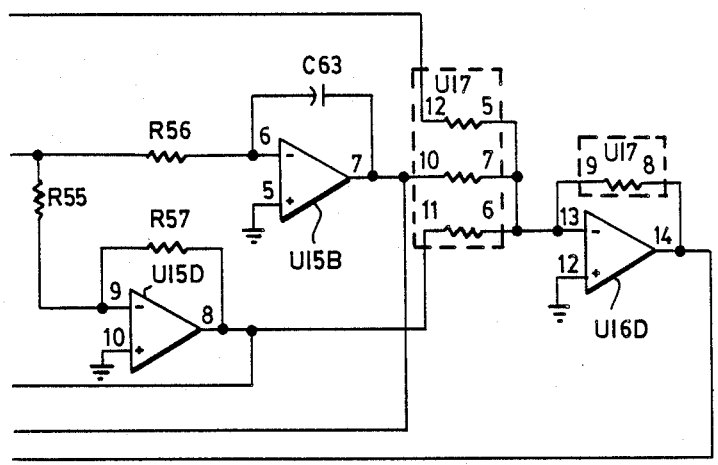
Figure 5B:
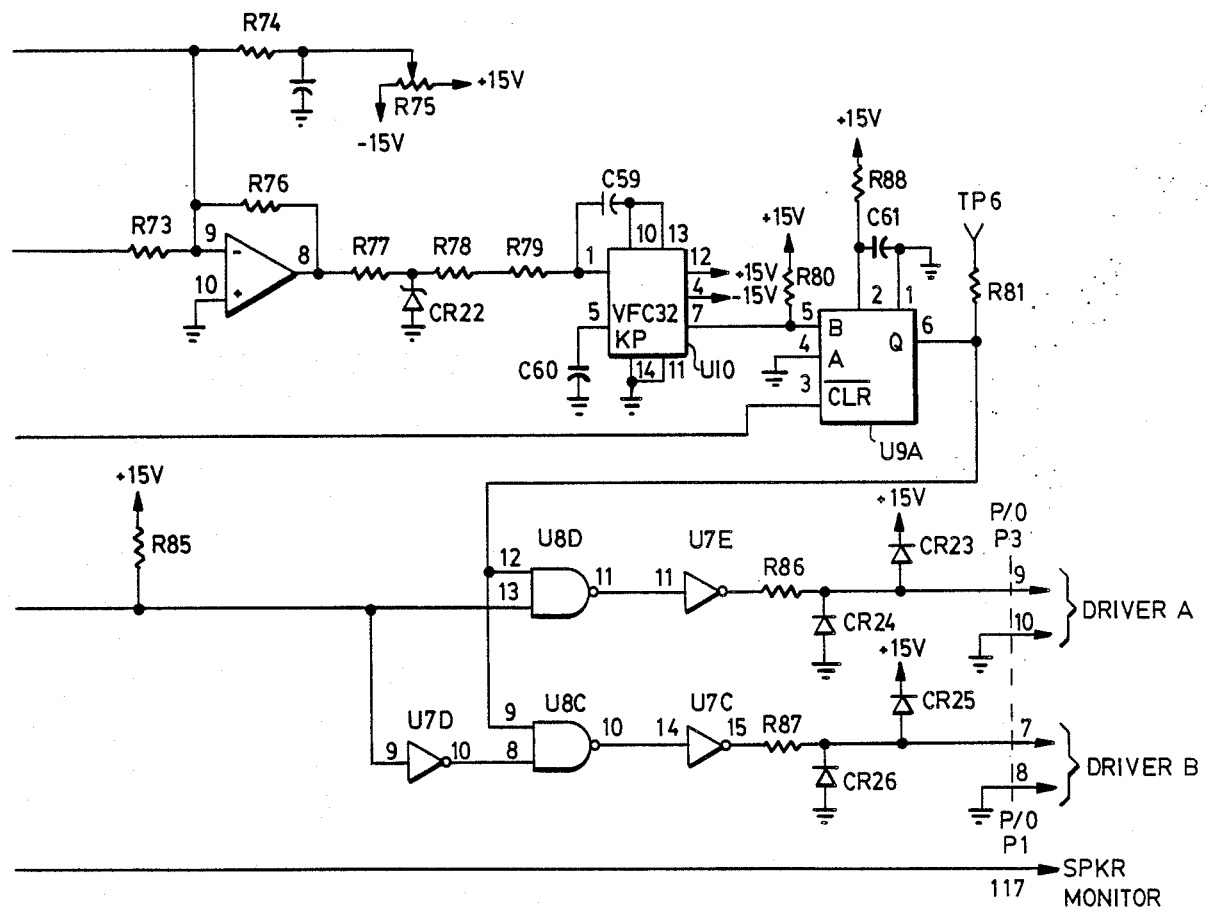

In field operations, a mobile vibrator mounted on a truck is used, of the type depicted in FIG. 1. Since trucked-mounted vibrators are well known in the art, this operation will be explained only briefly. Baseplate 10 is lowered so as to be in contact with the ground. Vibrations of controlled and varying frequency are imparted to the ground through baseplate 10 by means of stilts 12. A reaction mass 16 is attached to the upper ends of the stilts 12 opposite the base plate 10. The reaction mass 16 cooperates with the stilts 12 by imparting force to the base plate 10. When the survey is completed, baseplate 10 is raised so that truck 14 can be moved to the next survey site.

Estimating Sound Pressure Levels

A simplistic model for estimating sound pressure levels caused by a vibrating baseplate is that of a rigid planar circular piston source, vibrating in an infinite, rigid baffle. All transmission is assumed through lossless air. For this model, the sound pressure p in pascals (Pa) generated by a piston of radius r oscillating at frequency w at an acceleration a, measured at an angle b from the normal and a distance d from the source (d >> r) may be described using the following equation:

$$p(w,t,r) = [r0 \, a \, r^2 \, J1(x) \, \exp\{j(wt-kd)\}]/d \, x$$

where r0 is the density of air, k is the wave number, J1 is a Bessel function of the first kind of order 1; and x = k r sin (b). This equation is derived in P.M. Morse (1948). For horizontal propagation of energy, the angle b is 90 degrees.

The model described above is simplistic, and ignores several factors which must be taken into account. First, the baseplate is not typically circular, but rectangular in shape. A typical baseplate is four feet wide by eight feet long. (For purposes of comparison to the model, a circular baseplate of comparable area would be three feet in radius.)

In the model, the vibrating baseplate is assumed rigid; however, measurements of representative baseplates has shown phase and amplitude differences between different points on a baseplate for frequencies as low as 50 Hz. As frequency increases, the outer portion of the baseplate experiences greater acceleration than the center, and lags behind the center region in phase. One test yielded a 40 degree phase shift and amplitude variation of 8 dB for a frequency of 100 Hz.

Strictly speaking, reaction mass 16 shown in FIG. 1 contributes to air wave generation. However, studies of the waves generated have shown that the total mass of the vibrator produces waves as a dipole with one element above the other, so the vibrations produced by the two element are in anti-phase. Since the air waves of concern here are the waves propagating horizontally toward geophones placed at a distance, the effects of reaction mass 16 may be ignored.

Baseplate acceleration generally increases with frequency at the low end of the seismic band (below 20 Hz); as a result, air wave production also increases with increasing frequency. Above 30 Hz or above ground resonance, the baseplate acceleration generally levels off.

Measurements indicate air wave pickup at the geophones usually attains a maximum in the 60-100 Hz frequency range.

Sound Cancellation Through Anti-Phase Sound Generation

Because the baseplate is not a simple rigid circular piston, it does not exactly follow the model discussed above. From analysis of the simple piston in a baffle, it can be shown that the sound pressure resulting from the motion of the piston is directly proportional to acceleration. Treating the baseplate as a group of smaller plates whose size is acoustically small (less than a half wavelength in diameter), an acoustic source approximating the baseplate may be represented by an array of pistons, each acting individually.

FIG. 2 is a block diagram showing schematically the air wave suppression system of this invention. A number of accelerometers 12 are attached to the upper surface of baseplate 10 in a grid pattern. Sixteen accelerometers are used in this preferred embodiment of the air wave suppression system.

For convenience, adjacent accelerometers may be grouped into subarrays. The sixteen accelerometers of the preferred embodiment may be subdivided into four subarrays, 14, 16, 18 and 20, of four accelerometers, each approximately square in shape. Outputs of all the accelerometers in a subarray are electronically summed to form a signal representative of the acceleration of that region of the baseplate. The output signals ACC-1–ACC4 from the four subarrays are input to a signal conditioner 22.

In this embodiment, the signal conditioner has four channels, one for each subarray. Each channel contains a speaker compensation network. The output from each speaker compensation network is fed to a separate speaker located close to the subarray from which the input came, e.g., the channel which receives input ACC1 has its output directed to speaker 24. The speaker compensation network is designed so that, over the frequency range of interest (20–200 Hz), the speaker cone acceleration is in antiphase (i.e., 180 degrees out of phase) with and directly proportional to the acceleration applied as a channel input. The network may also be modified to compensate for any resonances the speaker may have when mounted in a cabinet. The speakers should be selected so as to be suitable for use with the low frequencies used in seismic surveying. A suitable speaker is the 2285H manufactured by JBL Professional of California.

The speaker compensation network also adjusts the frequency and phase of the speaker vibrations to match that of the baseplate. Because baseplate vibration is not a constant frequency, but is a sweep across a frequency range, the network must adjust in real time to the changing frequency.

Figure 7A:
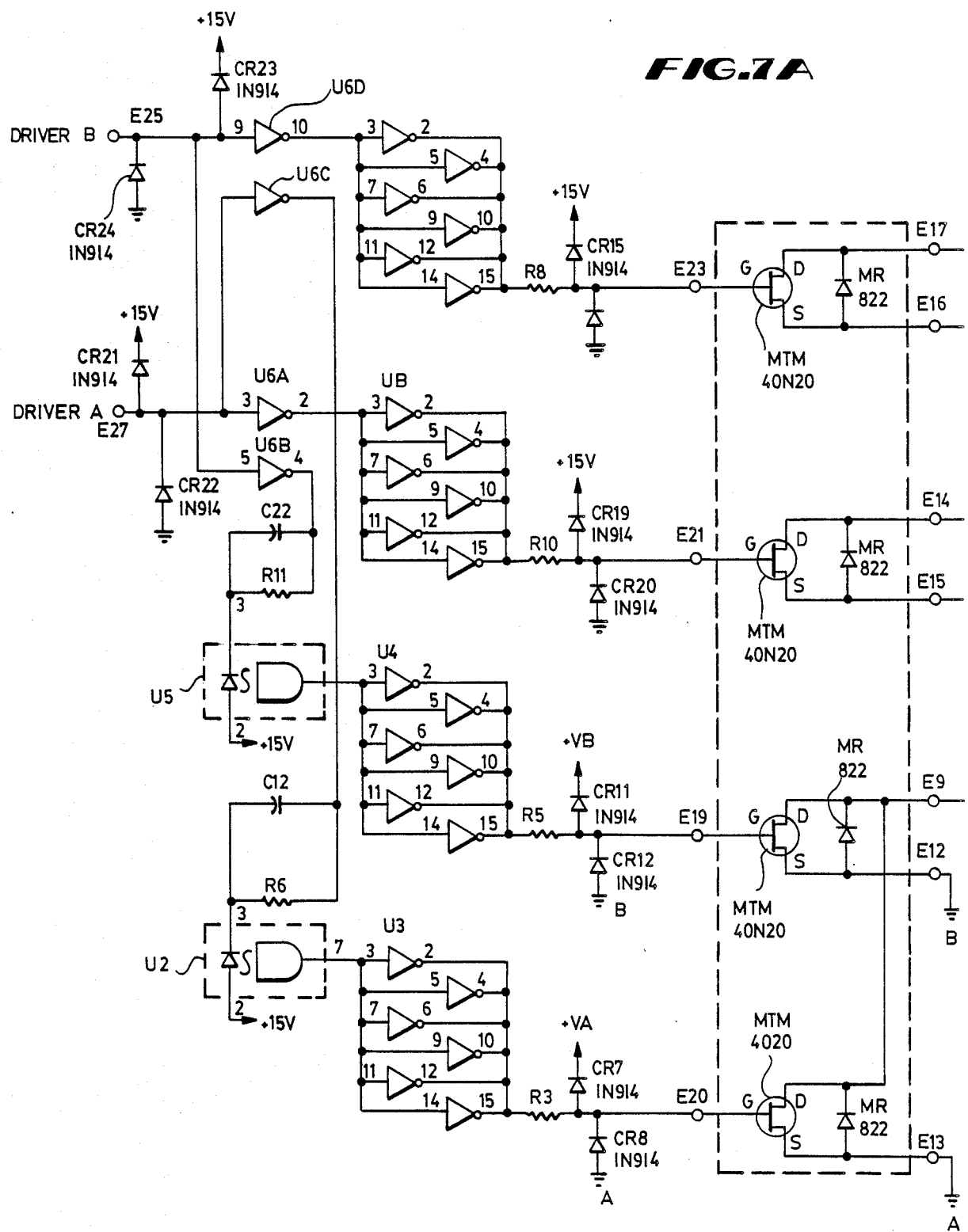
Figure 7B:
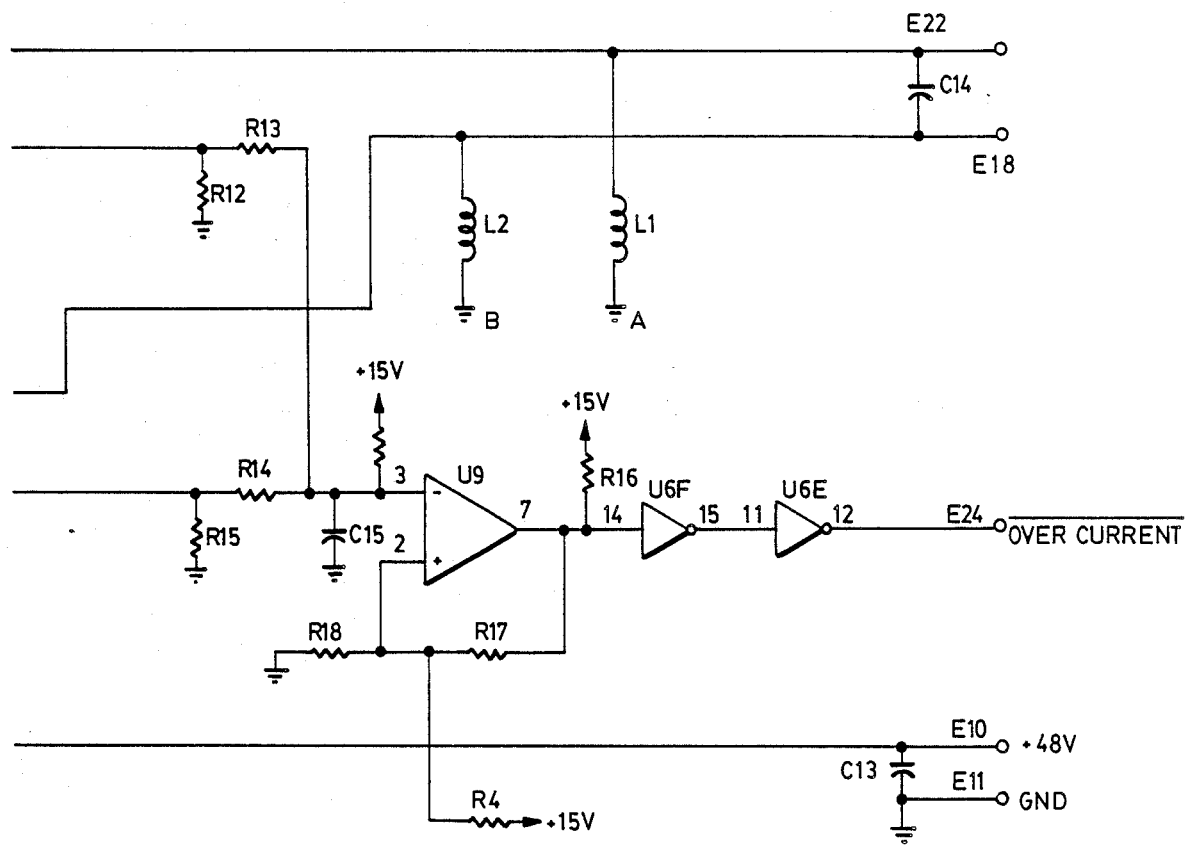

FIGS. 3, 4, 5A and 5B depict a preferred embodiment of the summer and speaker compensation network for one of the channels of the signal conditioner. FIGS. 6, 7A and 7B depict a preferred embodiment of the power amplifier for driving one of the speakers; however, many types of power amplifiers may be used successfully.

The gain of each subarray channel is adjusted at the factory so that its output sound pressure level will be the same as that of a plate with one-fourth the area of the baseplate when a voltage equivalent to the plate acceleration is applied. Each speaker is preferably located approximately above the center of the subarray of accelerometers used to drive the channel to which it is connected, so that the speaker and section of the baseplate occupy the same vertical position.

Referring back to the model discussed earlier, the set of speakers act as a second set of pistons. Both occupy the same location for the generation of air waves in the horizontal direction, and have essentially equal amplitude, but the speaker-generated sound waves are directly opposite in phase from those of the baseplate. Therefore, the sound energy propagating horizontally outward is cancelled. If the speakers are placed an acoustically small distance above the baseplate, global cancellation (i.e., in directions other than horizontal) may also be achieved.

In order to obtain good cancellation at frequencies greater than 150 Hz, finer sampling is required; this requires more accelerometers, more channels, and more speakers. Extension of the method described above is straightforward. Note that if the speakers cannot be situated directly above the baseplate, time delay compensation must be applied.

An additional benefit of this invention is the availability of accelerometer signals from all over the baseplate which may be combined to provide a better estimate of the baseplate assembly average acceleration than has been available in the past. This average acceleration is of value in better approximating the ground-force signal used to synchronize the vibrators with the correlation pilot signal.

The described embodiment may optionally contain means enabling the vibrator operator to determine that the sound attenuation system is operating to provide attenuation. A quality control microphone 26 is mounted at a distance above the ground approximately the same as the level of the upper surface of the baseplate and at a distance from the baseplate. The signal from the quality control microphone is fed through an all pass filter with two legs, producing two outputs which are 90° apart in phase but with the same amplitude. These outputs are mixed with a pilot signal from the electronics controlling the vibrator frequency which has been converted to a square wave. The resulting signals are low pass filtered, producing two D.C. signals. The two D.C. signals are squared and the squares summed, then a square root of the sum is taken. The output of the square root function is a D.C. signal which is proportional in amplitude to that part of the quality microphone signal which is coherent with the sweep. This is equivalent to a narrow band tracking filter. The filtered signal is fed to a display 28 on the operators' control panel which indicates whether satisfactory attenuation is being obtained, based on the level of the filtered signal.

Those of ordinary skill will recognize that other means including digital signal processing methods may be used to process the output of a transducer (either motion-sensitive or pressure-sensitive, like a microphone) to produce a signal for driving an array of speakers so that the speaker sound output is in anti-phase with that produced by the vibrator. Remote sensing of the airwave may also be used.

It will, of course, be apparent to those of ordinary skill having the benefit of this disclosure that various modifications may be made to the described embodiments which do not depart from the scope of the invention. It is therefore noted that the invention is intended to be limited only by the scope of the appended claims.

What is claimed is:

1. Method for suppressing the propagation of sound waves in air resulting from the vibration of a baseplate on a seismic vibrator, comprising the steps of:
    (a) attaching transducer means to the upper surface of the baseplate;
    (b) activating the transducer means to generate a signal representing the acceleration of the baseplate;
    (c) conditioning the signal received from the transducer means to produce a conditioned signal which is substantially in antiphase with and substantially proportional to the acceleration of the baseplate;
    (d) feeding the conditioned signal to a least one loudspeaker mounted in proximity to the baseplate so that said loudspeaker produces and sound waves which are substantially in antiphase with and substantially proportional to the acceleration of the baseplate;
    (e) measuring sound waves in the air at a prescribed distance from said baseplate and delivering a signal correlative thereto;
    (f) determining the level of attenuation of sound waves in the air in response to said measured signal; and
    (g) displaying the level of attenuation.

2. Apparatus for suppressing the propagation of sound waves in air resulting from the vibration of a baseplate on a seismic vibrator, comprising:
    (a) transducer means attached to the upper surface of the baseplate for generating an electronic signal representing the acceleration of the baseplate;
    (b) electronic means for conditioning the signal received from the transducer means to produce a conditioned signal which is substantially in antiphase with and substantially proportional to the acceleration of the baseplate;
    (c) means for amplifying the conditioned output signal;
    (d) at least one loudspeaker mounted in the proximity of the baseplate, said loudspeaker being adapted to produce sound waves which are substantially in antiphase with and substantially proportional to the acceleration of the baseplate in response to receiving said amplifier signal;
    (e) means for measuring sound waves in the air at a prescribed distance from said baseplate and delivering a signal correlative thereto;
    (f) means for determining the level of attenuation of sound waves in the air in response to said measured signal; and
    (g) means for displaying the level of attenuation.

* * * * *

UNITED STATES PATENT AND TRADEMARK OFFICE
CERTIFICATE OF CORRECTION

PATENT NO. : 4,930,113
DATED : May 29, 1990
INVENTOR(S) : John J. Sallas It is certified that error appears in the above-identified patent and that said Letters Patent is hereby corrected as shown below:

Col. 5, line 3, after "and" insert --its associated--.

Col. 6, line 24, delete --and--.

Signed and Sealed this

Fourth Day of June, 1991

Attest:

HARRY F. MANBECK, JR.

*Attesting Officer*

*Commissioner of Patents and Trademarks*